(12) United States Patent
Huang et al.

(10) Patent No.: US 10,361,894 B2
(45) Date of Patent: Jul. 23, 2019

(54) TECHNIQUES FOR A UNIFIED DEMODULATION REFERENCE SIGNAL PATTERN FOR VARIOUS MULTIPLEXING SCHEMES

(71) Applicant: QUALCOMM Incorporated, San Diego, CA (US)

(72) Inventors: Yi Huang, San Diego, CA (US); Wanshi Chen, San Diego, CA (US); Hao Xu, San Diego, CA (US); Wei Zeng, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 44 days.

(21) Appl. No.: 15/491,337

(22) Filed: Apr. 19, 2017

(65) Prior Publication Data
US 2018/0083818 A1 Mar. 22, 2018

Related U.S. Application Data

(60) Provisional application No. 62/397,732, filed on Sep. 21, 2016.

(51) Int. Cl.
*H04L 5/00* (2006.01)
*H04L 27/26* (2006.01)
*H04W 72/04* (2009.01)

(52) U.S. Cl.
CPC ........ *H04L 27/2613* (2013.01); *H04L 5/0023* (2013.01); *H04L 5/0051* (2013.01);
(Continued)

(58) Field of Classification Search
CPC . H04L 27/2613; H04L 5/0051; H04L 5/0007; H04L 5/0023; H04W 72/0446
See application file for complete search history.

(56) References Cited

U.S. PATENT DOCUMENTS

| | | | | |
|---|---|---|---|---|
| 2012/0314667 A1* | 12/2012 | Taoka | .................. | H04B 7/0452 370/329 |
| 2013/0182664 A1* | 7/2013 | Chen | .................. | H04W 72/042 370/329 |
| 2014/0016574 A1* | 1/2014 | Seo | ........................ | H04W 76/14 370/329 |

OTHER PUBLICATIONS

Intel Corporation: "NB-IoT Uplink Shared Channel Design", 3GPP Draft; R1-160131—NB-PUSCH, 3rd Generation Partnership Project (3GPP), Mobile Competence Centre ; 650, Route Des Lucioles; F-06921 Sophia-Antipolis Cedex; France, vol. RAN WG1, No. Budapest, HU; Jan. 18, 2016-Jan. 20, 2016 Jan. 17, 2016, XP051053450, Retrieved from the Internet: URL:http://www.3gpp.org/ftp/Meetings_3GPP_SYNC/RAN1/Docs/ [retrieved on Jan. 17, 2016], 9 pages.

(Continued)

*Primary Examiner* — Mohammad S Anwar
(74) *Attorney, Agent, or Firm* — Arent Fox LLP

(57) ABSTRACT

A method and apparatus for demodulation reference signal (DMRS) communication are described. The method and apparatus include determining a DMRS pattern for at least two multiplexing schemes. In some aspects, the at least two multiplexing schemes may include orthogonal frequency-division multiplexing (OFDM) and single carrier frequency-division multiplexing (SC-FDM). Further, in some aspects, the DMRS pattern may correspond to a continuous tone pattern in each subframe transmitted in accordance with both SC-FDM and OFDM. Additionally, in some aspects, the DMRS pattern may correspond to a comb tone pattern in each subframe transmitted in accordance with both SC-FDM and OFDM. The method and apparatus further include transmitting a DMRS in accordance with at least one of the two multiplexing schemes and based on the DMRS pattern.

24 Claims, 4 Drawing Sheets

(52) U.S. Cl.
CPC ..... *H04L 27/2611* (2013.01); *H04W 72/0446* (2013.01); *H04L 5/0007* (2013.01)

(56) References Cited

OTHER PUBLICATIONS

Intel Corporation: "On Physical Layer Design for D2D Discovery", 3GPP Draft; R1-134140—Intel—Discovery Signal Design, 3rd Generation Partnership Project (3GPP), Mobile Competence Centre; 650, Route Des Lucioles; F-06921 Sophia-Antipolis Cedex; France, vol. RAN WG1, No. Guangzhou, China, Sep. 28, 2013, XP050717330, Retrieved from the Internet: URL:http://www.3gpp.org/ftp/tsg_ran/WG1_RL1/TSGR1_74b/Docs/ [retrieved on Sep. 28, 2013], 9 pages.

International Search Report and Written Opinion—PCT/US2017/047755—ISA/EPO—dated Oct. 24, 2017. (17 total pages).

LG Electronics: "DM-RS Patterns for New Carrier Type", 3GPP Draft; R1-131283, 3rd Generation Partnership Project (3GPP), Mobile Competence Centre; 650, Route Des Lucioles ; F-06921 Sophia-Antipolis Cedex; France, vol. RAN WG1, No. Chicago, USA; Apr. 6, 2013, XP050697160, Retrieved from the Internet: URL:http://www.3gpp.org/ftp/tsg_ran/WG1_RL1/TSGR1_72b/Docs/ [retrieved on Apr. 6, 2013], 9 pages.

\* cited by examiner

TECHNIQUES FOR A UNIFIED DEMODULATION REFERENCE SIGNAL PATTERN FOR VARIOUS MULTIPLEXING SCHEMES

CROSS-REFERENCE TO RELATED APPLICATION(S)

This application claims the benefit of U.S. Provisional Application Ser. No. 62/397,732, entitled "TECHNIQUES FOR A UNIFIED DEMODULATION REFERENCE SIGNAL PATTERN FOR VARIOUS MULTIPLEXING SCHEMES" and filed on Sep. 21, 2016, which is expressly incorporated by reference herein in its entirety.

BACKGROUND

Aspects of this disclosure relate generally to wireless communication networks, and more particularly to techniques for transmitting a unified demodulation reference signal (DMRS) pattern for various multiplexing schemes in a wireless communication network.

Wireless communication networks are widely deployed to provide various telecommunication services such as telephony, video, data, messaging, and broadcasts. Typical wireless communication networks may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems.

These multiple access technologies have been adopted in various telecommunication standards to provide a common protocol that enables different wireless devices to communicate on a municipal, national, regional, and even global level. For example, fifth generation (5G) New Radio (NR) communications technology is envisaged to expand and support diverse usage scenarios and applications with respect to current mobile network generations. In an aspect, 5G communications technology includes enhanced mobile broadband addressing human-centric use cases for access to multimedia content, services and data; ultra-reliable-low latency communications (URLLC) with strict requirements, especially in terms of latency and reliability; and massive machine type communications for a very large number of connected devices and typically transmitting a relatively low volume of non-delay-sensitive information. As the demand for mobile broadband access continues to increase, however, there exists a need for further improvements in 5G communications technology and beyond. Preferably, these improvements should be applicable to other multi-access technologies and the telecommunication standards that employ these technologies.

As the number of packets being transmitted increases with 5G, techniques are needed to provide efficient and improved process when communicating DMRS during wireless communications. In certain instances, as the next generation of wireless communications come into existence, more flexible multiplexing may be desired in order to ensure adequate or improved levels of wireless communications. Thus, improvements in DMRS communication during wireless communication are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, a method relates to demodulation reference signal (DMRS) communication. The method includes determining a DMRS pattern for at least two multiplexing schemes. The method further includes transmitting a DMRS in accordance with at least one of the two multiplexing schemes and based on the DMRS pattern.

In some aspects, an apparatus for DMRS communication includes a memory and a processor coupled to the memory. The processor may be configured to determine a DMRS pattern for at least two multiplexing schemes. The processor may further be configured to transmit a DMRS in accordance with at least one of the two multiplexing schemes and based on the DMRS pattern.

In some aspects, an apparatus for DMRS communication includes means for determining a DMRS pattern for at least two multiplexing schemes. The apparatus further includes means for transmitting a DMRS in accordance with at least one of the two multiplexing schemes and based on the DMRS pattern.

In some aspects, a computer-readable medium storing computer executable code for DMRS communication includes code for determining a DMRS pattern for at least two multiplexing schemes. The computer-readable medium further includes code for transmitting a DMRS in accordance with at least one of the two multiplexing schemes and based on the DMRS pattern.

Various aspects and features of the disclosure are described in further detail below with reference to various examples thereof as shown in the accompanying drawings. While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout, where dashed lines may indicate optional components or actions, and wherein.

DETAILED DESCRIPTION

Figure 1:
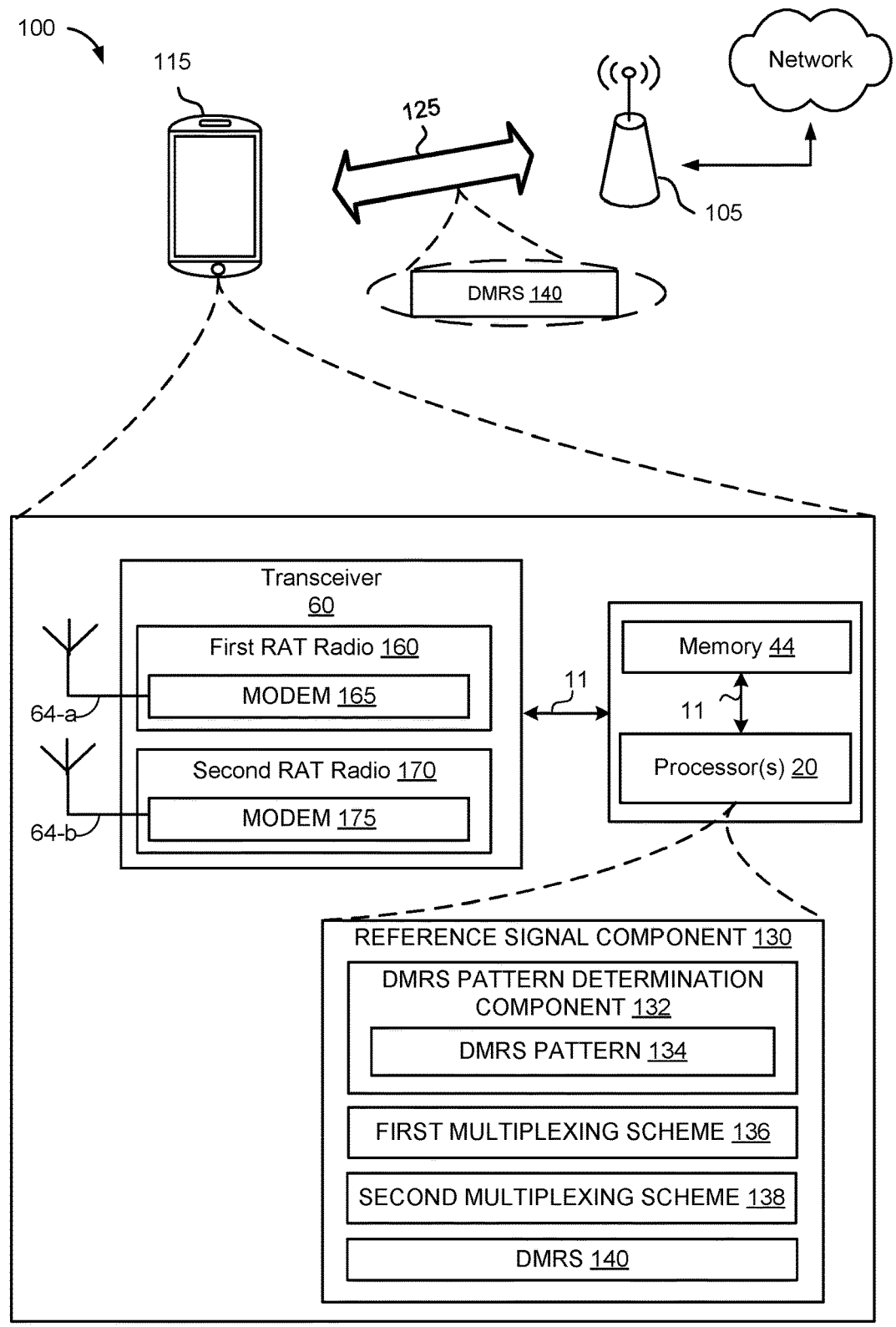
FIG. 1 is schematic diagram of a wireless communication network including an aspect of an reference signal component for wireless communications in accordance with one or more exemplary aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. In an aspect, the term "component" as used herein may be one of the parts that make up a system, may be hardware or software, and may be divided into other components.

The present aspects generally relate to demodulation reference signal (DMRS) communication in a wireless communication system. Specifically, DMRS is a type of reference signal that provides modulation/demodulation information related to a communication channel (e.g., physical uplink control channel (PUCCH) and/or physical uplink shared channel (PUSCH)) to a network entity for accurate or coherent decoding of communications transmitted via the communication channel. For example, DMRS may be communicated in accordance with or otherwise for various multiplexing schemes. The various multiplexing schemes may include, but are not limited to, orthogonal frequency-division multiplexing (OFDM) and/or single carrier frequency-division multiplexing (SC-FDM). For each multiplexing scheme, a DMRS may be communicated based on a distinct DMRS pattern. As such, for each multiplexing scheme, a distinct pilot and/or data channel may be used for communication.

However, such communication structures may be redundant as a single DMRS pattern may be applied to or used for two or more multiplexing schemes. Accordingly, such implementation allows for more flexible user equipment (UE) multiplexing to facilitate multiplexing of a UE communicating using OFDM with another UE communicating using SC-FDM in the same radio bearer. Further, such implementation may allow for more flexible multi-user multiple-input multiple-output (MU-MIMO) communication such that specific or different multiplexing schemes are associated with or used for communication on distinct layers. Additionally, data channelization may be simplified such that separate pilot and/or data channels may not be used for different multiplexing schemes.

Accordingly, in some aspects, the present methods and apparatuses may provide an efficient solution, as compared to conventional solutions, by communicating a DMRS for two or more multiplexing schemes based on the same DMRS pattern. In other words, in the present aspects, a UE and/or network entity may efficiently and effectively communicate DMRS using various multiplexing schemes using a unified DMRS pattern. As such, the present aspects provide one or more mechanisms for determining a DMRS pattern for at least two multiplexing schemes. The present aspects further provide one or more mechanisms for transmitting a DMRS in accordance with at least one of the two multiplexing schemes and based on the DMRS pattern. Specifically, in some aspects, the DMRS may be transmitted based on a waveform (e.g., SC-FDM or OFDM) using a comb based DMRS tone structure associated with one or both of SC-FDM or OFDM.

Referring to FIG. 1, in an aspect, a wireless communication system 100 includes at least one user equipment (UE) 115 in communication coverage of at least network entities 105. The UE 115 may communicate with a network via network entity 105. In an example, the UE 115 may transmit and/or receive wireless communication to and/or from the network entity 105 via one or more communication channels 125, which may include an uplink communication channel (or simply uplink channel bandwidth region) for transmission of data from the UE 115 to the network entity 105 and a downlink communication channel (or simply downlink channel bandwidth region) for transmission of data from the network entity 105 to the UE 115, such as but not limited to an uplink data channel and/or downlink data channel, a control channel. Such wireless communications may include, but are not limited to, data, audio and/or video information. Moreover, in an example, the wireless communications between the UE 115 and the network entity 105 may include 5G NR communications.

In accordance with the present disclosure, the UE 115 may include a memory 44, one or more processors 20 and a transceiver 60. The memory 44, one or more processors 20 and the transceiver 60 may communicate internally via a bus 11. In some examples, the memory 44 and the one or more processors 20 may be part of the same hardware component (e.g., may be part of a same board, module, or integrated circuit). Alternatively, the memory 44 and the one or more processors 20 may be separate components that may act in conjunction with one another. In some aspects, the bus 11 may be a communication system that transfers data between multiple components and subcomponents of the UE 115. In some examples, the one or more processors 20 may include any one or combination of modem processor, baseband processor, digital signal processor and/or transmit processor, or any other processor that may, for example, determine a DMRS pattern for at least two multiplexing schemes and transmit a DMRS in accordance with at least one of the two multiplexing schemes and based on the DMRS pattern.

Additionally or alternatively, the one or more processors 20 may include a reference signal component 130 for carrying out one or more methods or procedures described herein. In an aspect, the term "component" as used herein may be one of the parts that make up a system, may be hardware, firmware, and/or software, and may be divided into other components. The reference signal component 130, and each of its subcomponents, may comprise hardware, firmware, and/or software and may be configured to execute code or perform instructions stored in a memory (e.g., a computer-readable storage medium). In an aspect, network entity 105 may also include the reference signal component 130.

In some examples, the UE 115 may include the memory 44, such as for storing data used herein and/or local versions of applications or communication with reference signal component 130 and/or one or more of its subcomponents being executed by the one or more processors 20. The memory 44 can include any type of computer-readable medium usable by a computer or processor 20, such as random access memory (RAM), read only memory (ROM), tapes, magnetic discs, optical discs, volatile memory, non-volatile memory, and any combination thereof. In an aspect, for example, the memory 44 may be a computer-readable storage medium (e.g., a non-transitory medium) that stores one or more computer-executable codes defining reference signal component 130 and/or one or more of its subcomponents, and/or data associated therewith, when the UE 115 is operating one or more processors 20 to execute reference signal component 130 and/or one or more of its subcomponents. In some examples, the UE 115 may further include a transceiver 60 for transmitting and/or receiving one or more data and control signals to/from the network via the network entity 105. The transceiver 60 may comprise hardware, firmware, and/or software and may be configured to execute code or perform instructions stored in a memory (e.g., a computer-readable storage medium). The transceiver 60 may include a first radio access technology (RAT) radio 160 (e.g. UMTS/WCDMA, LTE-A, WLAN, Bluetooth, WSAN-FA) comprising a modem 165, and a second RAT radio 170 (e.g., 5G) comprising a modem 175. The first RAT radio 160 and second RAT radio 170 may utilize one or more antennas 64 for transmitting signals to and receiving signals from the network entity 105. In some examples, the transceiver 60 may only include the second RAT radio 170.

For example, the UE 115 may include the reference signal component 130, which may be configured to facilitate communication of the DMRS 140 for various multiplexing schemes using a unified DMRS pattern. Specifically, the reference signal component 130 may include a DMRS pattern 134 determination component 132, which may be configured to determine a DMRS pattern 134 for both of a first multiplexing scheme 136 and a second multiplexing scheme 138 based on a waveform (e.g., SC-FDM or OFDM). That is, the DMRS pattern 134 may be dependent on a selection of the first multiplexing scheme 136 or the second multiplexing scheme 138. In some aspects, the first multiplexing scheme 136 may be or otherwise correspond to SC-FDM, and the second multiplexing scheme 138 may be or otherwise correspond to OFDM.

Figure 2:
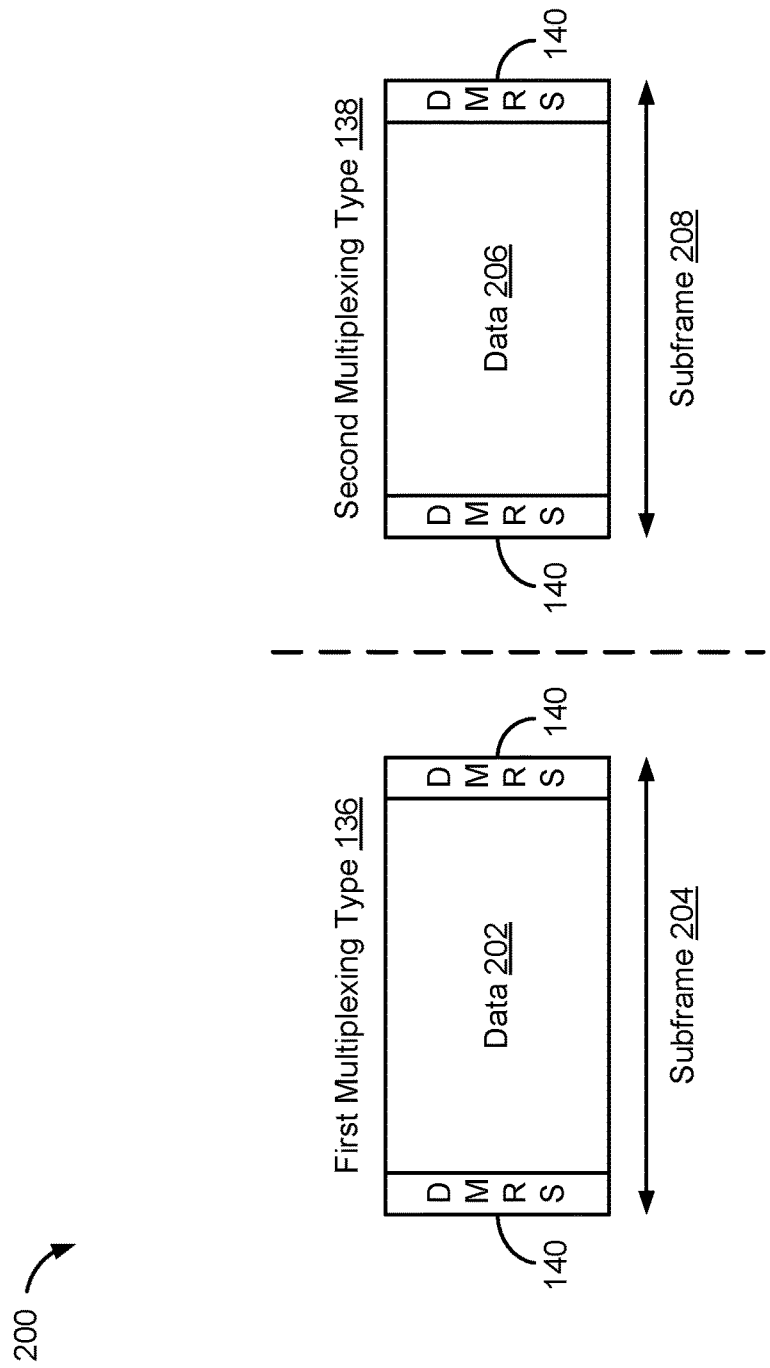
FIG. 2 is a conceptual diagram of demodulation reference signal (DMRS) patterns in accordance with one or more exemplary aspects.

In particular, the DMRS pattern determination component 132 may be configured to determine or otherwise utilize a continuous tone pattern as part of or corresponding to the DMRS pattern 134 in each subframe transmitted in accordance with both the first multiplexing scheme 136 (e.g., SC-FDM) and the second multiplexing scheme 138 (e.g., OFDM). In such instance, the DMRS pattern 134 may correspond to an SC-FDM DMRS pattern as shown in FIG. 2. That is, the DMRS pattern 134 may be based on an SC-FDM structure for not only SC-FDM, but also OFDM. As such, the DMRS 140 may be transmitted on continuous DMRS tones for both SC-FDM (first multiplexing scheme 136) and OFDM (second multiplexing scheme 138).

Figure 3:
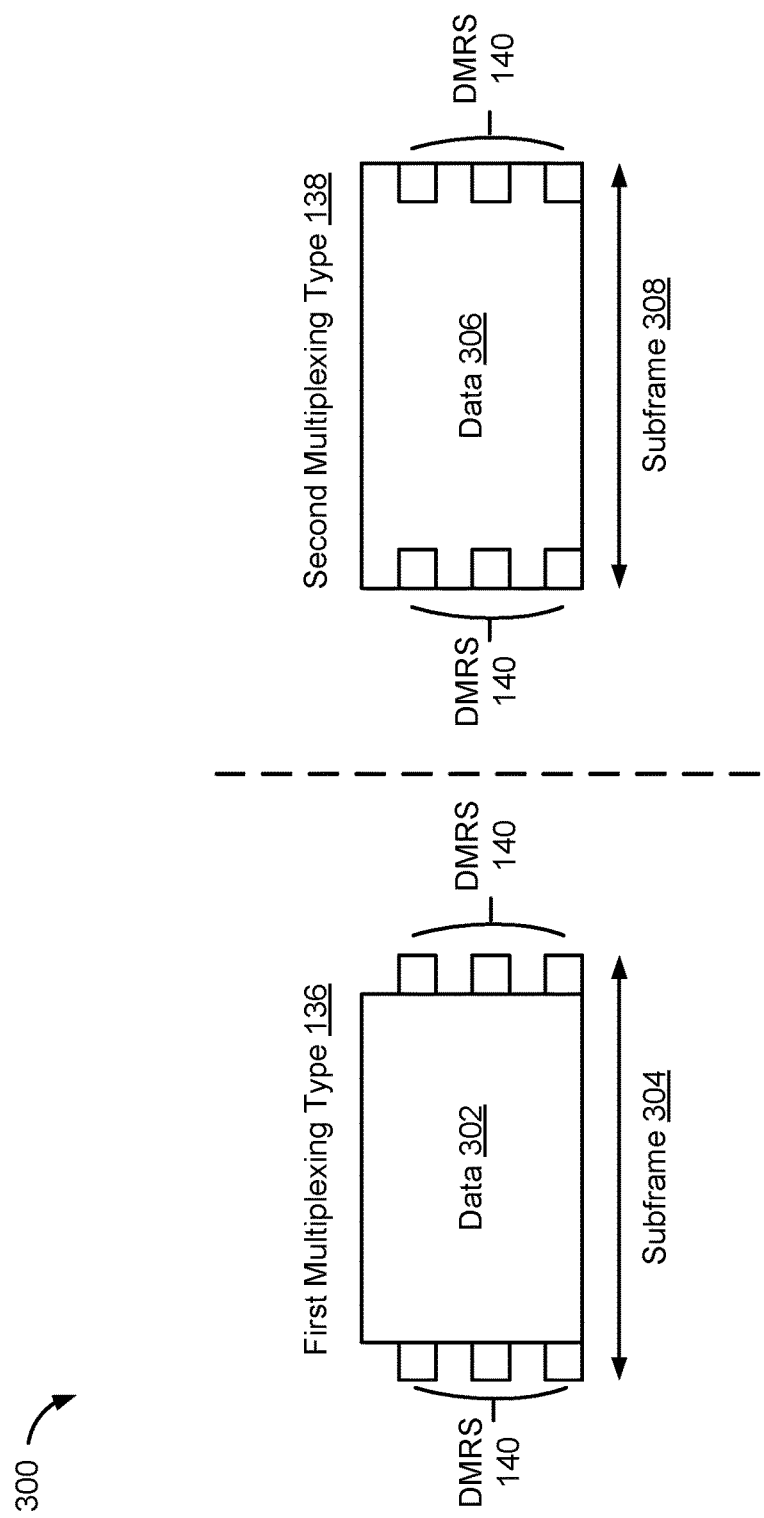
FIG. 3 is a conceptual diagram of further DMRS patterns in accordance with one or more exemplary aspects.

The DMRS pattern determination component 132 may be configured to determine or otherwise utilize a comb based tone pattern as part of or corresponding to the DMRS pattern 134 in each subframe transmitted in accordance with both SC-FDM (first multiplexing scheme 136) and OFDM (second multiplexing scheme 138). In such instance, the DMRS pattern 134 may correspond to an OFDM DMRS pattern as shown in FIG. 3. That is, the DMRS pattern 134 may be based on an OFDM structure for not only OFDM, but also SC-FDM. Accordingly, the DMRS 140 may be transmitted on comb based DMRS tones for both SC-FDM (first multiplexing scheme 136) and OFDM (second multiplexing scheme 138).

In some aspects, a comb based tone pattern may interlace or interleave the DMRS 140 with at least one of data associated with the same UE 115 as the DMRS 140, or another DMRS associated with another UE. For example, the DMRS 140 may be transmitted on one subcarrier out of every 'X' subcarriers, where 'X' may be any integer value greater than one. This may result in the DMRS being transmitted on evenly spaced subcarriers occupying a comb-like structure. Data may be transmitted on the remaining subcarriers that are not used for the DMRS.

However, in some aspects, for transmissions according to SC-FDM (first multiplexing scheme 136), the data tones may be left empty or unoccupied as part of transmitting the DMRS 140. On the other hand, for transmissions according to OFDM (second multiplexing scheme 138), data may be transmitted on the data tones as part of transmitting the DMRS 140. Further, for an OFDM based transmission structure adopting a comb based tone DMRS pattern 134, the DMRS pattern 134 may be used for communication on both the uplink and downlink.

The UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. The UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. The UE 115 may be able to communicate with macro eNodeBs, small cell eNodeBs, relays, and the like. The UE 115 may also be able to communicate over different access networks, such as cellular or other WWAN access networks, or WLAN access networks.

Additionally, as used herein, the one or more wireless nodes, including, but not limited to, network entity 105 of wireless communication system 100, may include one or more of any type of network component, such as an access point, including a base station or node B, an eNodeB a relay, a peer-to-peer device, an authentication, authorization and accounting (AAA) server, a mobile switching center (MSC), a radio network controller (RNC), etc. In a further aspect, the one or more wireless serving nodes of wireless communication system 100 may include one or more macro and/or small cell base stations, such as, but not limited to a femtocell, picocell, microcell, or any other base station having a relatively small transmit power or relatively small coverage area as compared to a macro base station.

FIG. 2 illustrates a conceptual diagram 200 of a DMRS pattern 134 for both the first multiplexing type 136 and the second multiplexing type 138. For example, the first multiplexing type 136 (e.g., SC-FDM) and the second multiplexing type 138 (e.g., OFDM) may use a continuous tone pattern as part of or corresponding to the DMRS pattern 134 in each subframe transmission (e.g., subframes 204 and 208). Further, data 202 may be included in one or more data tones along subframe 204 and data 206 may be included in one or more data tones within subframe 206. As such, a unified DMRS pattern 134 may be based on an SC-FDM structure for both the first multiplexing type 136 (e.g., SC-FDM) and the second multiplexing type 138 (e.g., OFDM).

FIG. 3 illustrates a conceptual diagram 300 of a respective DMRS pattern 134 for both the first multiplexing type 136 and the second multiplexing type 138. For example, the first multiplexing type 136 (e.g., SC-FDM) and the second multiplexing type 138 (e.g., OFDM) may use a comb based tone pattern as part of or corresponding to the DMRS pattern 134 in each subframe transmission (e.g., subframes 304 and 308). In some aspects, for transmissions according to the first multiplexing scheme 136 (e.g., SC-FDM), the data tones may be unoccupied or empty as part of transmitting the DMRS 140. However, for transmissions according to the second multiplexing scheme 138 (e.g., OFDM), data may be transmitted on the data tones as part of transmitting the DMRS 140. Additionally, for an OFDM based transmission structure adopting a comb based tone DMRS pattern 134, a unified DMRS pattern 134 may be used for communication on both the uplink and downlink. As such, a unified DMRS pattern 134 may be based on an OFDM structure for both the first multiplexing type 136 (e.g., SC-FDM) and the second multiplexing type 138 (e.g., OFDM).

Figure 4:
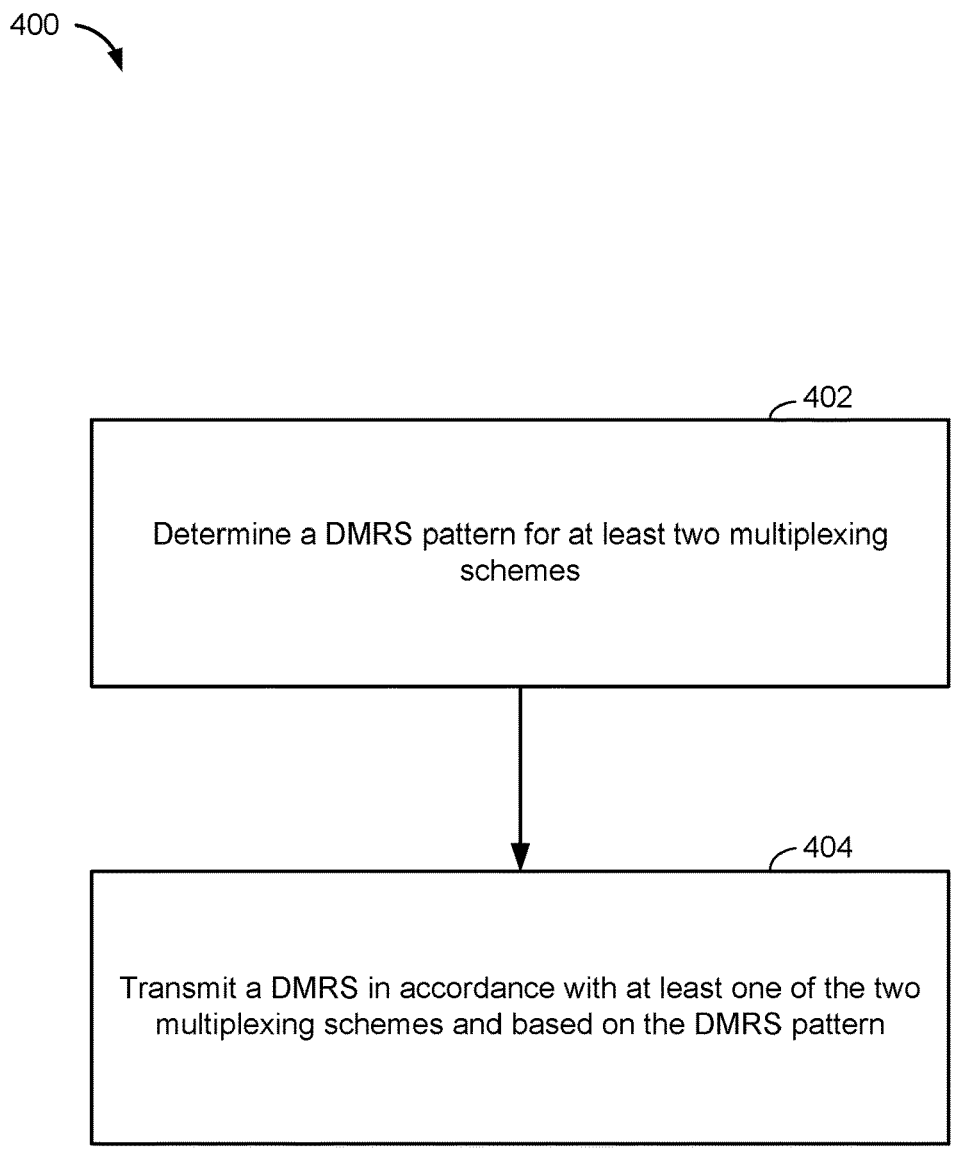
FIG. 4 is a flow diagram illustrating an example method of DMRS communication in a wireless communication system in accordance with one or more exemplary aspects.

FIG. 4 is a flow diagram illustrating examples of methods related to formatting sub-headers of a PDU with various aspects of the present disclosure. Although the operations described below are presented in a particular order and/or as being performed by an example component, it should be understood that the ordering of the actions and the components performing the actions may be varied, depending on the implementation. Also, although the reference signal component 130 is illustrated as having a number of subcomponents, it should be understood that one or more of the illustrated subcomponents may be separate from, but in communication with, the reference signal component 130, and/or each other. Moreover, it should be understood that any of actions or components described below with respect to the reference signal component 130 and/or with subcomponents of the reference signal component 130 may be performed by a specially-programmed processor, a processor executing specially-programmed software or computer-readable media, or by any other combination of a hardware component and/or a software component specially configured for performing the described actions or components.

In an aspect, at block 402, a method 400 may determine a DMRS pattern for at least two multiplexing schemes. In an aspect, for example, the UE 115 (FIG. 1) and/or the reference signal component 130 (FIG. 1) may execute the DMRS pattern determination component 132 (FIG. 1) to determine a DMRS pattern 134 (FIG. 1) for at least two multiplexing schemes (e.g., first multiplexing scheme 136 and second multiplexing scheme 138, FIG. 1).

In some aspects, the at least two multiplexing schemes may include OFDM and SC-FDM. Further, in some aspects, the DMRS pattern 134 may correspond to a continuous tone pattern in each subframe transmitted in accordance with both SC-FDM and OFDM. Additionally, in some aspects, the DMRS pattern 134 corresponds to a comb tone pattern in each subframe transmitted in accordance with both SC-FDM and OFDM.

Further, at block 404, the method 400 may transmit a DMRS in accordance with at least one of the two multiplexing schemes and based on the DMRS pattern. In an aspect, for example, the UE 115 (FIG. 1) may execute the reference signal component 130 and/or the transceiver 60 to transmit a DMRS 140 (FIG. 1) in accordance with at least one of the two multiplexing schemes and based on the DMRS pattern 134.

In some aspects, transmitting the DMRS 140 in accordance with SC-FDM may include transmitting the DMRS 140 including one or more unoccupied or empty data tones within at least one subframe based on the DMRS pattern 134 corresponding to the comb tone pattern. Further, in some aspects, transmitting the DMRS 140 in accordance with OFDM may include transmitting the DMRS 140 including one or more occupied or full data tones within at least one subframe based on the DMRS pattern 134 corresponding to the DMRS comb tone pattern.

In some aspects, the DMRS 140 may be transmitted on a single radio bearer in accordance with the at least one of the two multiplexing schemes (e.g., one of SC-FDM or OFDM) along with another DMRS on the radio bearer in accordance with another one of the two multiplexing schemes (e.g., the other of SC-FDM or OFDM). Moreover, in some aspects, each of the at least two multiplexing schemes may be associated with a distinct multi-input multi-output (MIMO) layer, and transmitting the DMRS in accordance with at least one of the two multiplexing schemes may include transmitting the DMRS on the distinct MIMO layer associated with the at least one of the two multiplexing schemes. In some aspects, transmitting the DMRS may include transmitting on at least one of an uplink communication channel or a downlink communication channel.

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the disclosure can include a computer readable medium embodying a method for dynamic bandwidth management for transmissions in unlicensed spectrum. Accordingly, the disclosure is not limited to the illustrated examples.

While the foregoing disclosure shows illustrative aspects, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of demodulation reference signal (DMRS) communication, comprising:
   determining a single DMRS pattern corresponding to at least one of a continuous tone pattern or a comb tone pattern for at least two multiplexing schemes, wherein the at least two multiplexing schemes include orthogonal frequency-division multiplexing (OFDM) and single carrier frequency-division multiplexing (SC-FDM); and
   transmitting a DMRS in accordance with at least one of the two multiplexing schemes and based on the single DMRS pattern, and wherein, if the single DRMS pattern corresponds to the comb tone pattern, transmitting the DMRS in accordance with SC-FDM includes transmitting the DMRS including one or more unoccupied data tones within at least one subframe based on the single DMRS pattern corresponding to the comb tone pattern.

2. The method of claim 1, wherein the single DMRS pattern corresponds to the continuous tone pattern in each subframe transmitted in accordance with both SC-FDM and OFDM.

3. The method of claim 1, wherein the single DMRS pattern corresponds to the comb tone pattern in each subframe transmitted in accordance with both SC-FDM and OFDM.

4. The method of claim 3, wherein transmitting the DMRS in accordance with OFDM includes transmitting the DMRS including one or more occupied data tones within at least one subframe based on the single DMRS pattern corresponding to the DMRS comb tone pattern.

5. The method of claim 1, wherein transmitting the DMRS includes transmitting the DMRS on a radio bearer in accordance with the at least one of the two multiplexing schemes along with another DMRS on the radio bearer in accordance with another one of the two multiplexing schemes.

6. The method of claim 1, wherein each of the at least two multiplexing schemes is associated with a distinct multi-input multi-output (MIMO) layer, and wherein transmitting the DMRS in accordance with at least one of the two multiplexing schemes includes transmitting the DMRS on the distinct MIMO layer associated with the at least one of the two multiplexing schemes.

7. The method of claim 1, wherein transmitting the DMRS includes transmitting on at least one of an uplink communication channel or a downlink communication channel.

8. An apparatus demodulation reference signal (DMRS) communication, comprising:
   a memory; and
   a processor coupled to the memory and configured to:
      determine a single DMRS pattern corresponding to at least one of a continuous tone pattern or a comb tone pattern for at least two multiplexing schemes, wherein the at least two multiplexing schemes include orthogonal frequency-division multiplexing (OFDM) and single carrier frequency-division multiplexing (SC-FDM); and
      transmit a DMRS in accordance with at least one of the two multiplexing schemes and based on the single DMRS pattern, and wherein, if the single DRMS pattern corresponds to the comb tone pattern, transmitting the DMRS in accordance with SC-FDM includes transmitting the DMRS including one or more unoccupied data tones within at least one subframe based on the single DMRS pattern corresponding to the comb tone pattern.

9. The apparatus of claim 8, wherein the single DMRS pattern corresponds to the continuous tone pattern in each subframe transmitted in accordance with both SC-FDM and OFDM.

10. The apparatus of claim 8, wherein the single DMRS pattern corresponds to the comb tone pattern in each subframe transmitted in accordance with both SC-FDM and OFDM.

11. The apparatus of claim 10, wherein to transmit the DMRS in accordance with OFDM, the processor is further configured to transmit the DMRS including one or more occupied data tones within at least one subframe based on the single DMRS pattern corresponding to the DMRS comb tone pattern.

12. The apparatus of claim 8, wherein to transmit the DMRS, the processor is further configured to transmit the DMRS on a radio bearer in accordance with the at least one of the two multiplexing schemes along with another DMRS on the radio bearer in accordance with another one of the two multiplexing schemes.

13. The apparatus of claim 8, wherein each of the at least two multiplexing schemes is associated with a distinct multi-input multi-output (MIMO) layer, and wherein to transmit the DMRS in accordance with at least one of the two multiplexing schemes, the processor is further configured to transmit the DMRS on the distinct MIMO layer associated with the at least one of the two multiplexing schemes.

14. The apparatus of claim 8, wherein to transmit the DMRS, the processor is further configured to transmit on at least one of an uplink communication channel or a downlink communication channel.

15. An apparatus for demodulation reference signal (DMRS) communication, comprising:

means for determining a single DMRS pattern corresponding to at least one of a continuous tone pattern or a comb tone pattern for at least two multiplexing schemes, wherein the at least two multiplexing schemes include orthogonal frequency-division multiplexing (OFDM) and single carrier frequency-division multiplexing (SC-FDM); and means for transmitting a DMRS in accordance with at least one of the two multiplexing schemes and based on the single DMRS pattern, and wherein, if the single DRMS pattern corresponds to the comb tone pattern, transmitting the DMRS in accordance with SC-FDM includes transmitting the DMRS including one or more unoccupied data tones within at least one subframe based on the single DMRS pattern corresponding to the comb tone pattern.

16. The apparatus of claim 15, wherein the single DMRS pattern corresponds to:

the comb tone pattern in each subframe transmitted in accordance with both SC-FDM and OFDM.

17. The apparatus of claim 16, wherein the means for transmitting the DMRS in accordance with OFDM includes means for transmitting the DMRS including one or more occupied data tones within at least one subframe based on the single DMRS pattern corresponding to the DMRS comb tone pattern.

18. The apparatus of claim 15, wherein the means for transmitting the DMRS includes means for transmitting the DMRS on a radio bearer in accordance with the at least one of the two multiplexing schemes along with another DMRS on the radio bearer in accordance with another one of the two multiplexing schemes.

19. The apparatus of claim 15, wherein the single DMRS pattern corresponds to the continuous tone pattern in each subframe transmitted in accordance with both SC-FDM and OFDM.

20. A non-transitory computer-readable medium storing computer executable code for demodulation reference signal (DMRS) communication, comprising:

code for determining a single DMRS pattern corresponding to at least one of a continuous tone pattern or a comb tone pattern for at least two multiplexing schemes, wherein the at least two multiplexing schemes include orthogonal frequency-division multiplexing (OFDM) and single carrier frequency-division multiplexing (SC-FDM); and code for transmitting a DMRS in accordance with at least one of the two multiplexing schemes and based on the single DMRS pattern, and wherein, if the single DRMS pattern corresponds to the comb tone pattern, transmitting the DMRS in accordance with SC-FDM includes transmitting the DMRS including one or more unoccupied data tones within at least one subframe based on the single DMRS pattern corresponding to the comb tone pattern.

21. The non-transitory computer-readable medium of claim 20, wherein the single DMRS pattern corresponds to:

the comb tone pattern in each subframe transmitted in accordance with both SC-FDM and OFDM.

22. The non-transitory computer-readable medium of claim 21, wherein the code for transmitting the DMRS in accordance with OFDM includes code for transmitting the DMRS including one or more occupied data tones within at least one subframe based on the single DMRS pattern corresponding to the DMRS comb tone pattern.

23. The non-transitory computer-readable medium of claim 20, wherein the code for transmitting the DMRS includes code for transmitting the DMRS on a radio bearer in accordance with the at least one of the two multiplexing schemes along with another DMRS on the radio bearer in accordance with another one of the two multiplexing schemes.

24. The non-transitory computer-readable medium of claim 20, wherein the single DMRS pattern corresponds to the continuous tone pattern in each subframe transmitted in accordance with both SC-FDM and OFDM.

* * * * *